(12) United States Patent
Wei et al.

(10) Patent No.: US 10,101,723 B2
(45) Date of Patent: Oct. 16, 2018

(54) SYSTEM AND METHOD FOR OPTIMIZING A WORK IMPLEMENT PATH

(71) Applicant: Caterpillar Inc., Peoria, IL (US)

(72) Inventors: Mo Wei, Dunlap, IL (US); Michael Taylor, Swissvale, PA (US); Thandava K. Edara, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 317 days.

(21) Appl. No.: 14/484,549

(22) Filed: Sep. 12, 2014

(65) Prior Publication Data

US 2016/0077513 A1    Mar. 17, 2016

(51) Int. Cl.
| | |
|---|---|
| *E01C 19/00* | (2006.01) |
| *E02F 3/84* | (2006.01) |
| *E02F 9/02* | (2006.01) |
| *E02F 9/26* | (2006.01) |
| *G05B 19/402* | (2006.01) |
| *G05D 1/02* | (2006.01) |
| *E02F 9/20* | (2006.01) |

(52) U.S. Cl.
CPC .......... *G05B 19/402* (2013.01); *E01C 19/004* (2013.01); *E02F 3/841* (2013.01); *E02F 9/205* (2013.01); *E02F 9/2045* (2013.01); *E02F 9/262* (2013.01); *G05D 1/0217* (2013.01); *G05B 2219/35188* (2013.01); *G05B 2219/49001* (2013.01)

(58) Field of Classification Search
CPC ...... E01C 19/004; E02F 3/841; E02F 9/2045; E02F 9/205; E02F 9/262; G05B 19/402; G05B 2219/35188; G05B 2219/49001; G05D 1/0217
See application file for complete search history.

(56) References Cited

U.S. PATENT DOCUMENTS

| | | |
|---|---|---|
| 5,551,524 A | 9/1996 | Yamamoto et al. |
| 5,864,970 A | 2/1999 | Maddock et al. |
| (Continued) | | |

FOREIGN PATENT DOCUMENTS

EP    2353353 A1 *  8/2011  .......... A01B 79/005

OTHER PUBLICATIONS

U.S. Appl. No. 14/484,694; U.S. Appl. No. 14/484,710; U.S. Appl. No. 14/484,548; U.S. Appl. No. 14/484,720; U.S. Appl. Nos. 14/484,601, 14/484,651, 14/484,735; U.S Appl. No. 14/484,586.*

*Primary Examiner* — Jennifer L Norton
(74) *Attorney, Agent, or Firm* — Leydig, Voit & Mayer, Ltd.

(57) ABSTRACT

A system for determining an optimized cut location for a work implement includes a position sensor and a controller. The controller is configured to determine the position of a work surface and determine a plurality of potential cut locations along a path between an initial cut location and an end location. The controller is further configured to determine an efficiency for moving an amount of material for each of the initial cut location and the plurality of potential cut locations based upon the amount of material to be moved, a parameter associated with moving the amount of material, and a loading profile, and select the optimized cut location from one of the initial cut location and the plurality of potential cut locations based upon the efficiency of each of the initial cut location and the plurality of potential cut locations.

19 Claims, 7 Drawing Sheets

(56) References Cited

U.S. PATENT DOCUMENTS

| | | | |
|---|---|---|---|
| 5,924,493 A * | 7/1999 | Hartman | E02F 3/431 172/4.5 |
| 5,944,764 A * | 8/1999 | Henderson | E02F 9/2045 342/457 |
| 6,085,130 A * | 7/2000 | Brandt | G05D 1/0278 701/26 |
| 6,167,336 A | 12/2000 | Singh et al. | |
| 6,363,632 B1 * | 4/2002 | Stentz | E02F 3/437 37/348 |
| 6,445,310 B1 | 9/2002 | Bateman et al. | |
| 6,845,311 B1 | 1/2005 | Stratton et al. | |
| 7,216,033 B2 | 5/2007 | Flann et al. | |
| 7,574,821 B2 * | 8/2009 | Furem | E02F 3/434 172/2 |
| 7,578,079 B2 | 8/2009 | Furem | |
| 7,734,398 B2 | 6/2010 | Manneppalli | |
| 7,979,175 B2 | 7/2011 | Allard et al. | |
| 8,073,584 B2 | 12/2011 | Marty et al. | |
| 8,139,108 B2 | 3/2012 | Stratton et al. | |
| 8,351,684 B2 | 1/2013 | Clar et al. | |
| 8,456,327 B2 | 6/2013 | Bechtel et al. | |
| 8,620,535 B2 | 12/2013 | Friend et al. | |
| 2007/0129869 A1 | 6/2007 | Gudat et al. | |
| 2008/0180523 A1 | 7/2008 | Stratton et al. | |
| 2009/0043462 A1 | 2/2009 | Stratton et al. | |
| 2009/0202109 A1 | 8/2009 | Clar et al. | |
| 2010/0250023 A1 | 9/2010 | Gudat | |
| 2011/0093171 A1 | 4/2011 | Saposnik | |
| 2012/0089293 A1 | 4/2012 | Halder et al. | |
| 2012/0136508 A1 | 5/2012 | Taylor et al. | |
| 2012/0139325 A1 | 6/2012 | Norberg et al. | |
| 2012/0154572 A1 | 6/2012 | Stratton et al. | |
| 2012/0215378 A1 | 8/2012 | Sprock et al. | |
| 2013/0311031 A1 * | 11/2013 | Friend | G05D 1/0278 701/26 |
| 2014/0012404 A1 | 1/2014 | Taylor et al. | |
| 2014/0032030 A1 | 1/2014 | Stratton et al. | |
| 2014/0032058 A1 | 1/2014 | Stratton et al. | |
| 2014/0032132 A1 | 1/2014 | Stratton et al. | |

* cited by examiner

SYSTEM AND METHOD FOR OPTIMIZING A WORK IMPLEMENT PATH

TECHNICAL FIELD

This disclosure relates generally to controlling a machine and, more particularly, to a system and method for planning a path of a work implement to optimize an operating parameter related to a material moving operation.

BACKGROUND

Machines such as dozers, motor graders, wheel loaders, etc., are used to perform a variety of tasks. For example, these machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

Movement of the machines and their associated work implements are often developed by a planning system or module. A plurality of variables may affect the planning system and impact the efficiency of the machine operation. It is often desirable to ensure that the machines perform the material movement operations such that the materials are moved in an efficient manner. For example, it may be desirable to ensure that the locations at which the machines begin to alter the work surface, and/or the profiles along which the machines alter the work surface, are chosen such that the machines function efficiently.

PCT Patent Publication No. 2008/0118027 discloses a method of contour shaping by a machine equipped with a cutting implement. The method includes providing a desired topographical plan, measuring the real time position of at least one of the machine and the cutting implement, generating instructions to move the cutting implement, plotting a transitional path from the real time position of the machine or the cutting implement to a point on the desired topographical plan, and using the transitional path and the real time position of the machine or the cutting implement to generate the instructions to move the cutting implement.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for determining an optimized cut location for a work implement of a machine includes a position sensor for generating position signals indicative of a position of a work surface, and a controller. The controller is configured to store a loading profile, store an end location of a path, determine the position of the work surface based upon the position signals, store an initial cut location, and determine a plurality of potential cut locations along the path between the initial cut location and the end location. The controller is further configured to determine an efficiency for moving an amount of material for each of the initial cut location and the plurality of potential cut locations based upon the amount of material to be moved, a parameter associated with moving the amount of material, and the loading profile, and select the optimized cut location from one of the initial cut location and the plurality of potential cut locations based upon the efficiency of each of the initial cut location and the plurality of potential cut locations.

In another aspect, a controller-implemented method for determining an optimized cut location for a work implement of a machine includes storing a loading profile, storing an end location of a path, determining the position of the work surface based upon position signals from a position sensor, storing an initial cut location, and determining a plurality of potential cut locations along the path between the initial cut location and the end location. The method further includes determining an efficiency for moving an amount of material for each of the initial cut location and the plurality of potential cut locations based upon the amount of material to be moved, a parameter associated with moving the amount of material, and the loading profile, and selecting the optimized cut location from one of the initial cut location and the plurality of potential cut locations based upon the efficiency of each of the initial cut location and the plurality of potential cut locations.

In still another aspect a machine includes a prime mover, a work implement for engaging a work surface along a path, a position sensor for generating position signals indicative of a position of the work surface, and a controller. The controller is configured to store a loading profile, store an end location of a path, determine the position of the work surface based upon the position signals, store an initial cut location, and determine a plurality of potential cut locations along the path between the initial cut location and the end location. The controller is further configured to determine an efficiency for moving an amount of material for each of the initial cut location and the plurality of potential cut locations based upon the amount of material to be moved, a parameter associated with moving the amount of material, and the loading profile, and select the optimized cut location from one of the initial cut location and the plurality of potential cut locations based upon the efficiency of each of the initial cut location and the plurality of potential cut locations.

DETAILED DESCRIPTION

Figure 1:
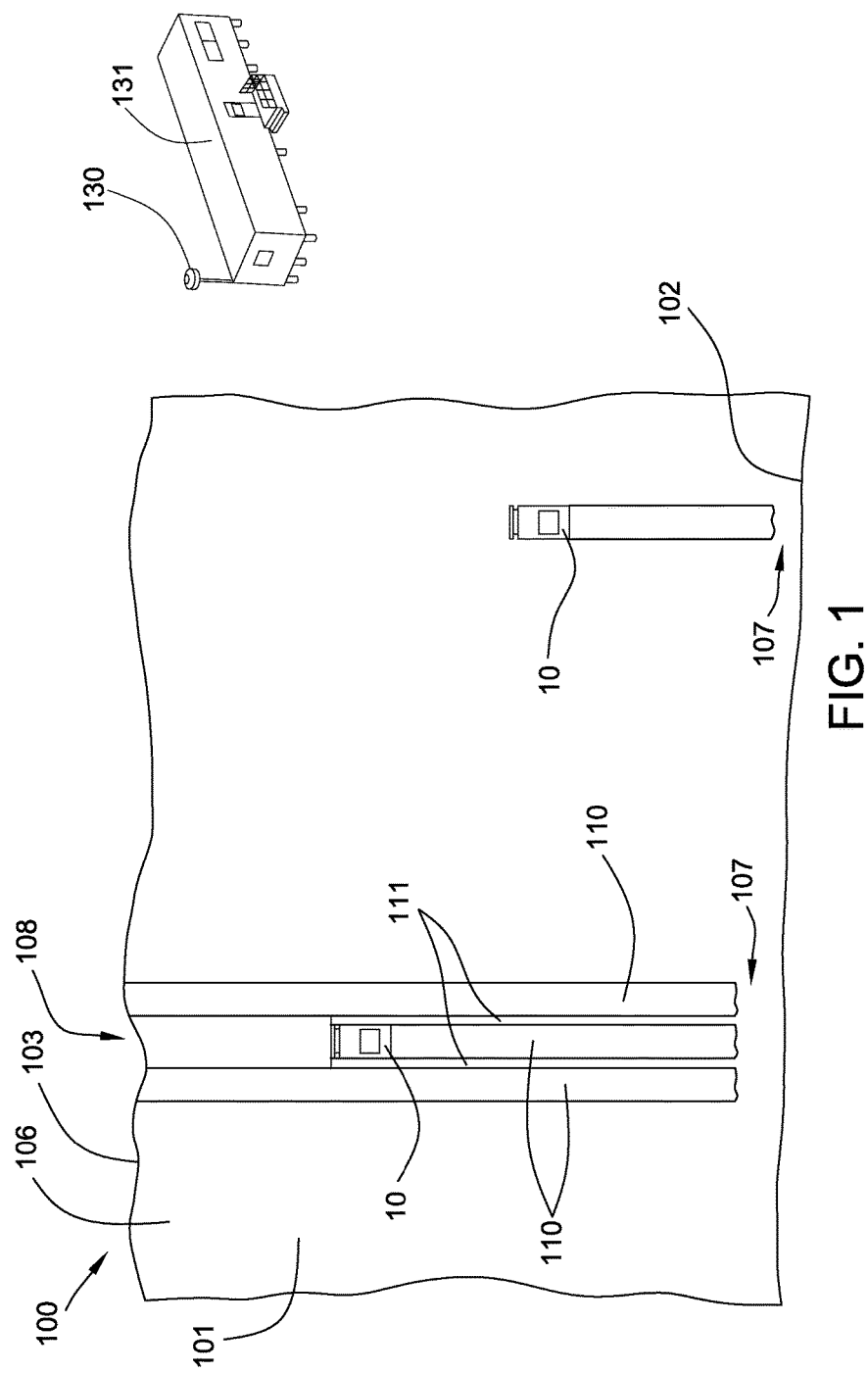
FIG. 1 depicts a schematic view of a work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, or any other area in which movement of material is desired. Tasks associated with moving material may include a dozing operation, a grading operation, a leveling operation, a bulk material removal operation, or any other type of operation that results in the alteration of the existing topography at work site 100. As depicted, work site 100 includes a work area 101 having a high wall 102 at one end and a crest 103 such as an edge of a ridge, embankment, or other change in elevation at an opposite end. Material is moved generally from the high wall 102 towards the crest 103. The work surface 104 of the work area 101 may take any form and refers to the actual profile or position of the terrain of the work area.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket of an excavator in a load truck and a controller may automatically return the bucket to a position to perform another digging operation. A machine being operated manually is one in which an operator is controlling all or essentially all of the functions of the machine. A machine may be operated remotely by an operator (i.e., remote control) in either a manual or semi-autonomous manner.

Figure 2:
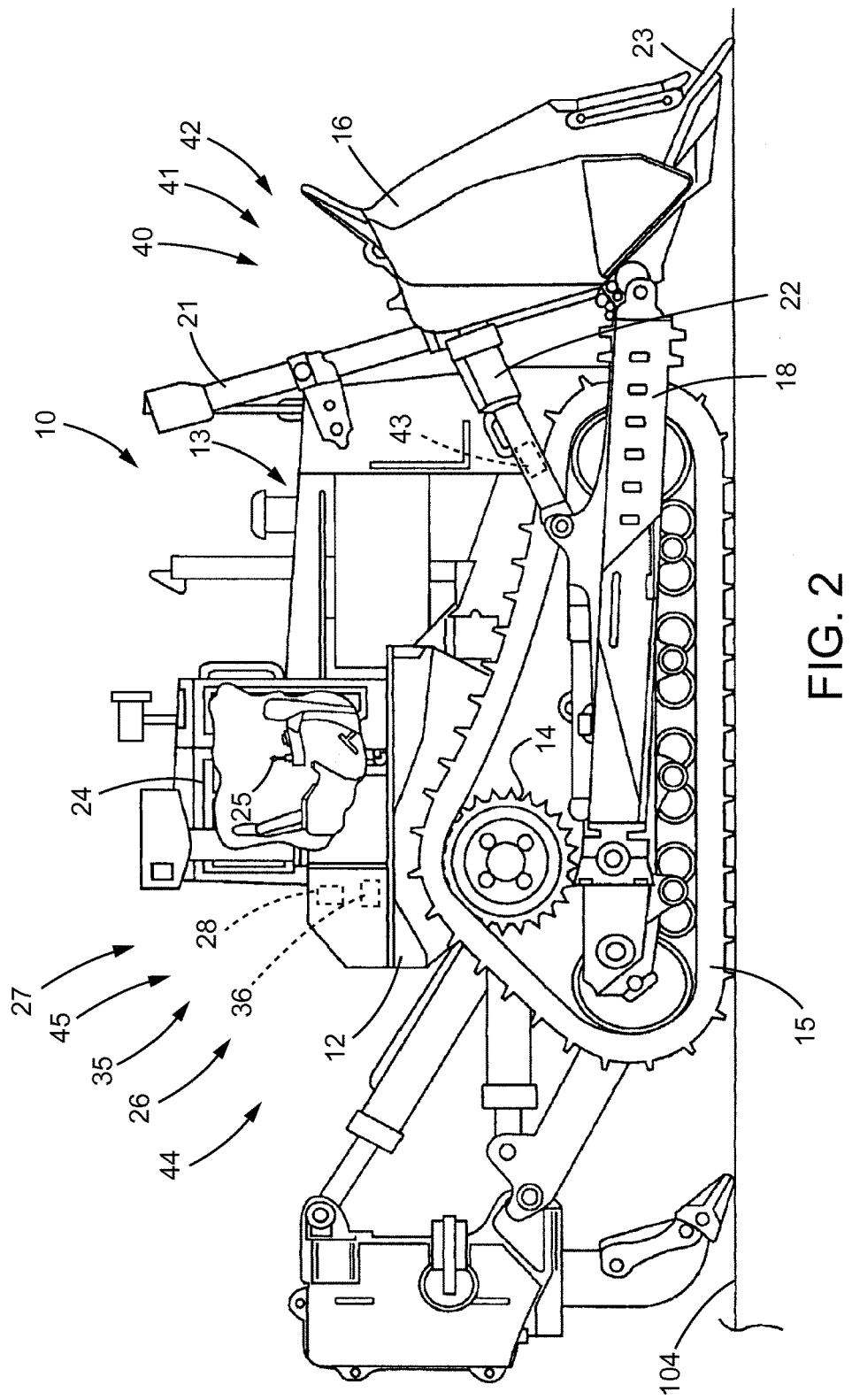
FIG. 2 depicts a diagrammatic illustration of a machine in accordance with the disclosure.

FIG. 2 depicts a diagrammatic illustration of a machine 10 such as a dozer with a ground engaging work implement such as a blade 16 configured to push material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used. Operation of the engine 13 and a transmission (not shown), which are operatively connected to the drive sprockets 14 and tracks 15, may be controlled by a control system 35 including a controller 36. The systems and methods of the disclosure may be used with any machine propulsion and drivetrain mechanisms applicable in the art for causing movement of the machine including hydrostatic, electric, or mechanical drives.

Blade 16 may be pivotally connected to frame 12 by arms 18 on each side of machine 10. First hydraulic cylinder 21 coupled to frame 12 supports blade 16 in the vertical direction and allows blade 16 to move up or down vertically from the point of view of FIG. 2. Second hydraulic cylinders 22 on each side of machine 10 allow the pitch angle of blade tip 23 to change relative to a centerline of the machine.

Machine 10 may include a cab 24 that an operator may physically occupy and provide input to control the machine. Cab 24 may include one or more input devices such as joystick 25 through which the operator may issue commands to control the propulsion system and steering system of the machine as well as operate various implements associated with the machine.

Machine 10 may be controlled by a control system 35 as shown generally by an arrow in FIG. 2 indicating association with the machine 10. The control system 35 may include an electronic control module or controller 36 and a plurality of sensors. The controller 36 may receive input signals from an operator operating the machine 10 from within cab 24 or off-board the machine through a wireless communications system 130 (FIG. 1). The controller 36 may control the operation of various aspects of the machine 10 including the drivetrain and the hydraulic systems.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 and the controller 36 may be located on the machine 10 and may also include components located remotely from the machine such as at a command center 131 (FIG. 1). The functionality of control system 35 may be distributed so that certain functions are performed at machine 10 and other functions are performed remotely. In such case, the control system 35 may include a communications system such as wireless communications system 130 for transmitting signals between the machine 10 and a system located remote from the machine.

Machine 10 may be configured to be operated autonomously, semi-autonomously, or manually. When operating semi-autonomously or manually, the machine 10 may be operated by remote control and/or by an operator physically located within the cab 24.

Machine 10 may be equipped with a plurality of machine sensors 26, as shown generally by an arrow in FIG. 2 indicating association with the machine 10, that provide data indicative (directly or indirectly) of various operating parameters of the machine and/or the operating environment in which the machine is operating. The term "sensor" is meant to be used in its broadest sense to include one or more sensors and related components that may be associated with the machine 10 and that may cooperate to sense various functions, operations, and operating characteristics of the machine and/or aspects of the environment in which the machine is operating.

A position sensing system 27, as shown generally by an arrow in FIG. 2 indicating association with the machine 10, may include a position sensor 28, also shown generally by an arrow in FIG. 2 to indicate association with the machine, to sense the position and orientation (i.e., the heading, pitch, roll or tilt, and yaw) of the machine relative to the work site 100. The position and orientation of the machine 10 are sometimes collectively referred to as the position of the machine. The position sensor 28 may include a plurality of individual sensors that cooperate to generate and provide position signals to controller 36 indicative of the position and orientation of the machine 10. In one example, the position sensor 28 may include one or more sensors that interact with a positioning system such as a global navigation satellite system or a global positioning system to operate as a position sensor. In another example, the position sensor 28 may further include a slope or inclination sensor such as pitch angle sensor for measuring the slope or inclination of the machine 10 relative to a ground or earth reference. The controller 36 may use position signals from the position sensors 28 to determine the position of the machine 10 within work site 100. In other examples, the position sensor 28 may include an odometer or another wheel rotation sensing sensor, a perception based system, or may use other systems such as lasers, sonar, or radar to determine all or some aspects of the position of machine 10.

In some embodiments, the position sensing system 27 may include a separate orientation sensing system. In other words, a position sensing system may be provided for determining the position of the machine 10 and a separate orientation sensing system may be provided for determining the orientation of the machine.

If desired, the position sensing system 27 may also be used to determine a ground speed of machine 10. Other sensors or a dedicated ground speed sensor may alternatively be used to determine the ground speed of the machine 10.

Machine 10 may be configured to move material at the work site 100 according to one or more material movement plans from an initial location 107 to a spread or dump location 108. The dump location 108 may be at crest 103 or at any other location. The material movement plans may include, among other things, forming a plurality of spaced apart channels or slots 110 that are cut into the work surface 104 at work site 100 along a path from the initial location 107 to the dump location 108. In doing so, each machine 10 may move back and forth along a linear path between the initial location 107 and the dump location 108. If desired, a relatively small amount of material may be left or built up as walls 111 between adjacent slots 110 to prevent or reduce spillage and increase the efficiency of the material moving process. The walls 111 between the slots 110 may be moved after the slots are formed or periodically as desired. The process of moving material through slots 110 while utilizing walls 111 of material to increase the efficiency of the process is sometime referred to as "slot dozing."

Figure 3:
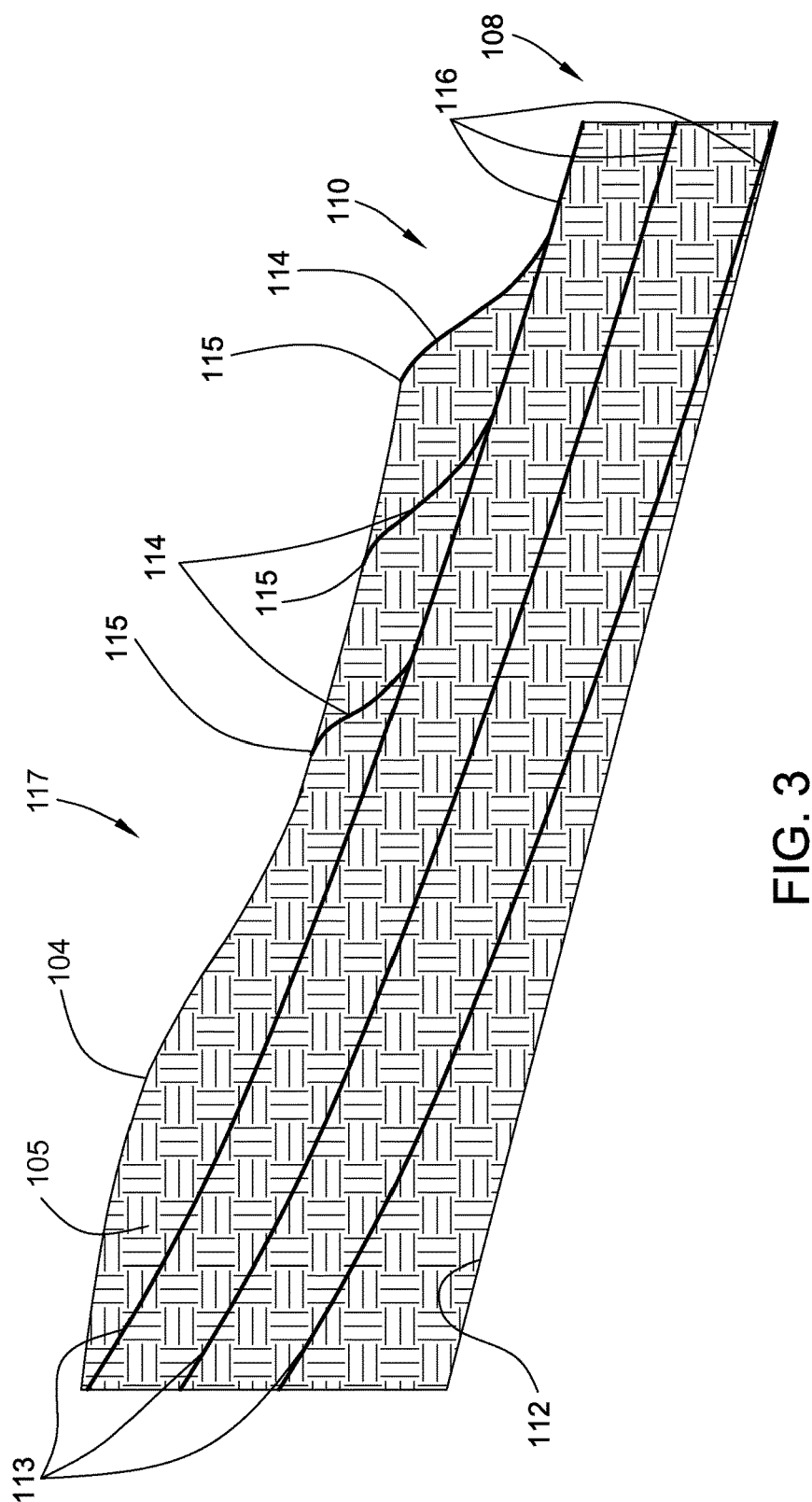
FIG. 3 depicts a cross-section of a portion of a work site depicting various aspects of a material moving plan.

As depicted in FIG. 3, in one embodiment, each slot 110 may be formed by removing material 105 from the work surface 104 in one or more layers or passes 113 until the final work surface or final design plane 112 is reached. The blade 16 of machine 10 may engage the work surface 104 with a series of cuts 114 that are spaced apart lengthwise along the slot 110. Each cut 114 begins at a cut location 115 along the work surface 104 at which the blade 16 engages the work surface and extends into the material 105 and moves towards the pass target or carry surface 116 for a particular pass. Controller 36 may be configured to guide the blade 16 along each cut 114 until reaching the carry surface 116 and then follow the carry surface towards the dump location 108.

Figure 4:
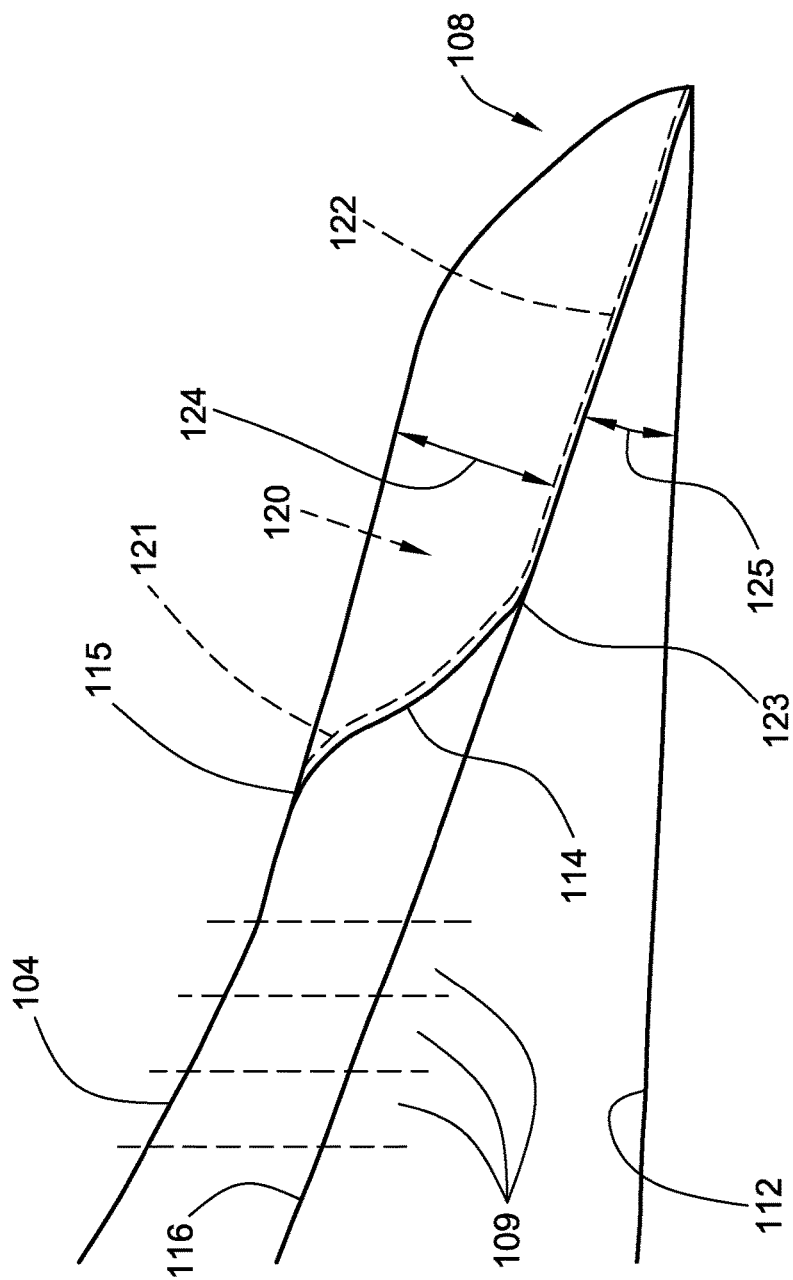
FIG. 4 depicts a diagrammatic cross-section of a portion of a work site depicting a potential target profile.

During each material moving pass, the controller 36 may guide the blade 16 generally along a desired path or target profile depicted by dashed line 120 in FIG. 4 from the cut location 115 to the dump location 108. A first portion of the target profile 120 extends from the cut location 115 to the carry surface 116. The first portion may be referred to as the loading profile 121 as that is the portion of the target profile 120 at which the blade 16 is initially loaded with material. A second portion of the target profile 120 extends from the intersection 123 of the cut 114 and the carry surface 116 to the dump location 108. The second portion may be referred to as the carry profile 122 as that is the portion of the target profile 120 at which the blade 16 carries the load along the carry surface 116.

The first portion or loading profile 121 may have any configuration and, depending on various factors including the configuration of the work surface 104 and the type of material to be moved, some cut profiles may be more efficient than others. The loading profile 121 may be formed of one or more segments that are equal or unequal in length and with each having different or identical shapes. These shapes may be linear, symmetrically or asymmetrically curved, Gaussian-shaped or any other desired shape. In addition, the angle of any of the shapes relative to the work surface 104 or the final design plane 112 may change from segment to segment.

The second portion or carry profile 122 may have any configuration but is often generally linear and sloped downward so that movement of material will be assisted by gravity to increase the efficiency of the material moving process. In other words, the carry profile 122 is often configured so that it slopes downward towards the dump location 108. The characteristics of the carry profile 122 (sometimes referred to as the slot parameters) may define the shape of the carry surface 116, the depth of the carry surface 116 below an uppermost surface of the work surface 104 as indicated by reference number 124, and the angle of the carry surface as indicated by reference number 125. In some instances, the angle 125 of the carry surface 116 may be defined relative to a gravity reference or relative to the final design plane 112.

Although it may be generally desirable for the blade 16 to follow the target profile 120, performance characteristics of the machine 10, characteristics of the material 105, and/or desired operating efficiencies may cause a deviation from the target profile 120. More specifically, as blade 16 makes a cut 114, the load on the blade will increase. Further, as the blade 16 travels along the carry surface 116, the load on the blade may continue to increase. If the blade 16 is overloaded for a particular slope, the machine 10 may slip and/or cause excess wear on the machine. Accordingly, the control system 35 may include a blade control system 40 to improve the efficiency of the material moving process.

In one embodiment, the blade control system 40 may control the load on the blade 16 so that the torque generated by the machine 10 is generally maintained at or about a predetermined value. In one example, it may be desirable to maintain the load on the machine 10 at approximately 80% of its maximum torque. In other examples, it may be desirable to maintain the load within a range of approximately 70-90% of the maximum torque. Other values and ranges are contemplated. In order to maintain the load at a desired value or within a desired range, the blade control system 40 may raise or lower the blade 16 to decrease or increase the amount of material carried by the blade 16 and thus decrease or increase the load.

The control system 35 may include an implement load monitoring system 41 shown generally by an arrow in FIG. 2. The implement load monitoring system 41 may include a variety of different types of implement load sensors depicted generally by an arrow in FIG. 2 as an implement load sensor system 42 to measure the load on the blade 16. In one embodiment, the implement load sensor system 42 may embody one or more pressure sensors 43 for use with one or more hydraulic cylinder, such as second hydraulic cylinders 22, associated with blade 16. Signals from the pressure sensor 43 indicative of the pressure within the second hydraulic cylinders 22 may be monitored by controller 36. Other manners of determining a change in cylinder pressure associated with a change in the load on blade 16 are contemplated, including other manners of measuring the pressure within second hydraulic cylinders 22 and measuring the pressure within other cylinders associated with the blade. The load on the blade 16 may be correlated to the load on the engine 13 by controller 36.

The load on the blade 16 may be affected by the slope of the terrain upon which the machine 10 is moving. Accordingly, if desired, the accuracy of the implement load measurement may be increased by utilizing the implement load sensor system 42 in conjunction with a slope or inclination sensor such as a pitch angle sensor. For example, if the machine 10 is moving uphill, the load on the blade 16 may be higher due to gravity as compared to a machine operating in the same conditions on flat terrain. Similarly, the load on the blade 16 may be lower for the same mass or volume when the machine in moving downhill. By determining the slope of the terrain, the controller 36 may more accurately determine changes in the load on the blade 16.

If desired, control system 35 may also include a machine load monitoring system 44 that may be used by the blade control system 40. In one embodiment, the machine load monitoring system 44 may utilize an engine speed sensor (not shown) and a torque converter speed sensor (not shown) to measure a difference between the speed of the engine 13 and a torque converter (not shown) to determine the load on the machine 10.

Control system 35 may include a module or planning system 45 for determining or planning various aspects of the excavation plan. The planning system 45 may receive and store various types of input such as the configuration of the work surface 104, the final design plane 112, a desired loading profile 121, a desired carry profile 122, and characteristics of the material to be moved. Operating characteristics and capabilities of the machine 10 such as maximum load may also be entered into the planning system 45. The planning system 45 may simulate the results of cutting the work surface 104 at a particular cut location and for a particular target profile, and then choose a cut location that creates the most desirable results based on one or more criteria. In one embodiment, the planning function may be performed while operating the machine 10. In another embodiment, some or all aspects of the planning function may be performed ahead of time and the various inputs to the planning system 45 and the resultant cut locations, target profiles, and related data stored as part of the data maps of the controller 36.

Referring to FIGS. 3 and 4, a potential cut 114 at work site 100 that may be generated by control system 35 is illustrated. Work surface 104 represents the uppermost height of the existing material 105 at the slot 110. While the illustration is depicted in two dimensions, it should be appreciated that the data representing the illustration may be in three dimensions. In one example, the path 117 along slot 110 may be divided into a plurality of increments 109 (FIG. 4) and data stored within controller 36 for each increment. The controller 36 may store information or characteristics of the increment 109 such as the length of the work surface and its angular orientation relative to a ground reference, the material characteristics of the material 105 beneath the work surface, a time stamp or indicator of the age of the data, and any other desired information. The information regarding each path 117 may be stored within an electronic map within controller 36 as part of a topographical map of the work site 100.

Information regarding each path 117 may be obtained according to any desired method. In one example, the machine 10 may utilize the position sensing system 27 described above to map out the contour of work surface 104 as machine 10 moves across it. This data may also be obtained according to other methods such as by a vehicle that includes lasers and/or cameras. It should be noted that as the machine 10 moves material 105 to the dump location 108, the position of the work surface 104 will change and may be updated based upon the current position of the machine 10 and the position of the blade 16.

As may be seen in FIG. 4, moving the blade 16 along the target profile 120 will result in a volume of material 105 being moved from slot 110. The planning system 45 may use the shape of the loading profile 121 and the cut location 115 to determine the volume of material that would be moved by blade 16 if the machine 10 were to follow the target profile 120. More specifically, the planning system 45 may use three-dimensional data that is used to represent the machine 10, the work surface 104, and the target profile 120 to make a volumetric calculation of the volume of material that will be moved for a particular target profile 120.

Planning system 45 may be configured to determine a cut location in any of a plurality of manners. In some embodiments, the planning system 45 may analyze a plurality of potential cut locations beginning with a cut location generally near the crest 103 and move potential cut locations uphill or towards the high wall 102 until desired parameters for a cut location are met and an initial cut location selected. In one example, the desired parameter may be the volume of material being moved reaching a desired threshold such as 80% of the maximum capacity of the machine 10.

As used herein, the word "uphill" refers to a direction towards the high wall 102 relative to the crest 103 or dump location 108. Similarly, the word "downhill" refers to a direction towards the crest 103 or dump location 108 relative to the high wall 102.

In order to increase the efficiency of the material moving process, planning system 45 may be configured to analyze additional potential cut locations based upon the amount of material moved as a function of one or more parameters once an initial cut location has been selected. These parameters may include the time required to reach or the distance from the end location, the fuel used to move to the dump location, or any other desired parameter. The amount of material moved may be expressed in terms of volume, percentage of load on the blade 16, or in any other desired manner. The efficiency of the potential cut locations may be compared to the efficiency of the initial cut location and the most efficient cut location chosen from the plurality of the initial cut location and the potential cut locations.

The planning system 45 may include two different types of thresholds that must be met before changing the cut location. A minimum load threshold may be required, such as a minimum percentage of load on the blade 16, before changing a cut location regardless of the efficiency. For example, a potential cut location may be discarded if the blade load is relatively low (e.g., lower than 30%) regardless of its level of efficiency. A minimum efficiency change threshold may also be required before changing a cut location. Since the planning system 45 is determining the efficiency of each cut location based upon a plurality of variables, the calculated efficiencies are estimates rather than empirical data. Accordingly, the planning system 45 may be configured to require the efficiency of a potential cut location to exceed the efficiency of the initial cut location 150 by an efficiency change threshold (e.g., 5-10%) before changing the cut location.

In one example, the planning system 45 may be configured to analyze additional potential cut locations to determine the most efficient cut location as a function of the amount of material moved relative to the time it takes to move such material to the end location. In other words, the planning system may measure the amount or volume of material moved per unit time. Accordingly, for the proposed cut, the efficiency would be:

$$V/T \qquad (1)$$

where V designates the volume of material moved by the blade 16 beginning at a cut location and T designates the length of time necessary to move the material from the initial cut location to an end location such as dump location 108.

The planning system 45 may be configured to divide the path 117 into a plurality of increments, such as increments 109, and determine the travel time along the path 117 from a cut location to the end location by determining the total of the travel times along the plurality of increments. The travel time along each increment may be based upon one or more increment parameters stored within the controller 36. These increment parameters may include the slope and curvature of the work surface 104 and/or the material characteristics of the material 105 since the speed through which the blade 16 may travel along the path 117 may depend on the slope of the work surface and/or the material characteristics. In an alternate embodiment, the planning system may be configured to store a target speed of the machine 10 and determine the length of time to travel from a cut location to the end location based upon the target speed.

If desired, other parameters may be used to determine the efficiency of a cut locations. For example, the amount of material moved may be replaced with the percentage of load of the machine 10. In another example, the time required to move material to the end location may be replaced with the distance from the cut location to the end location. In still another example, time may be replaced by the amount of fuel required to move the material to the end location. In doing so, the planning system 45 may calculate fuel consumption based upon a plurality of factors including the profile of the work surface 104, the gear in which the machine 10 is operating, and the load on the machine 10.

Figure 5:
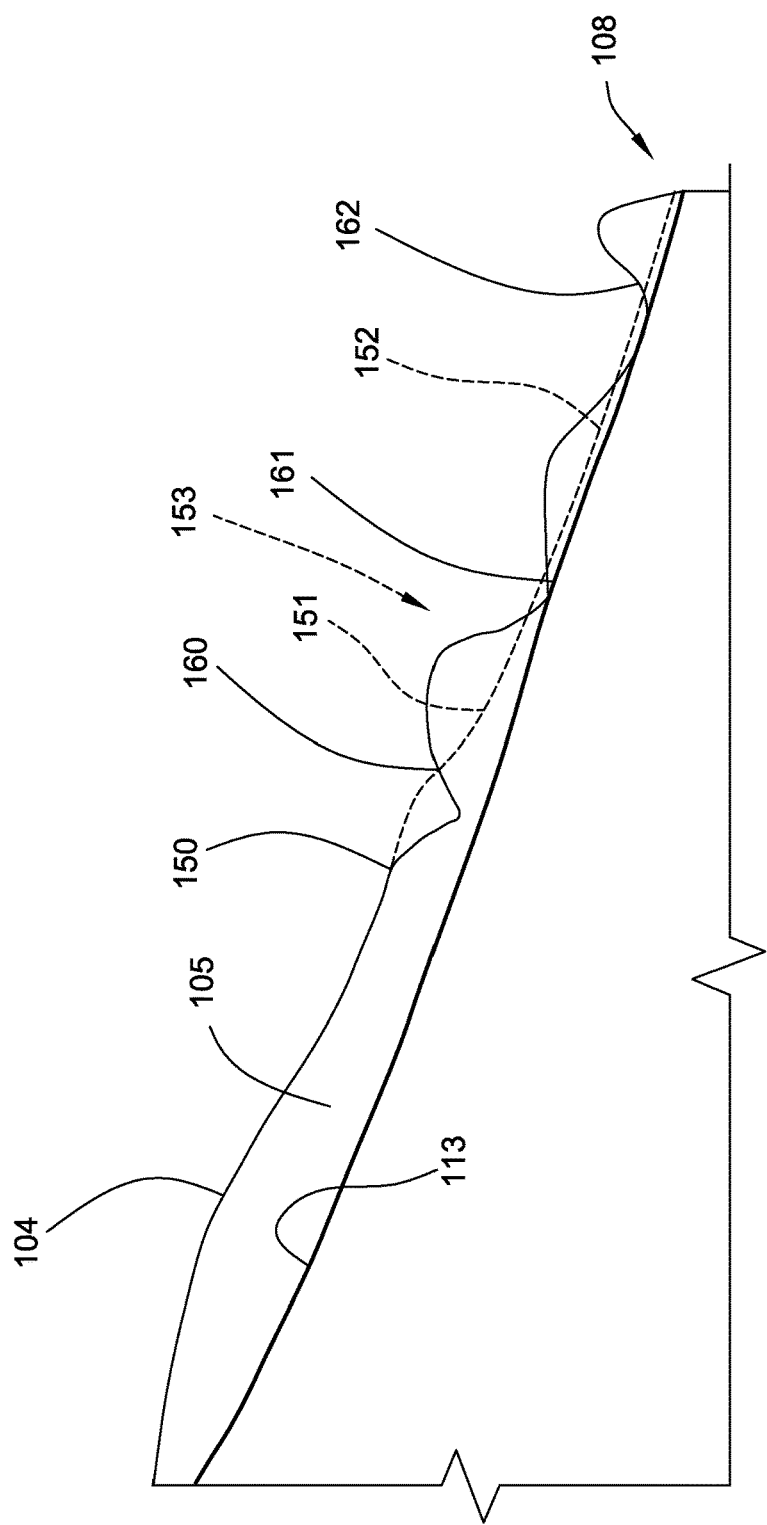
FIG. 5 depicts a cross-section of a portion of a work site depicting an aspect of the cut optimization process in accordance with the disclosure.
Figure 6:
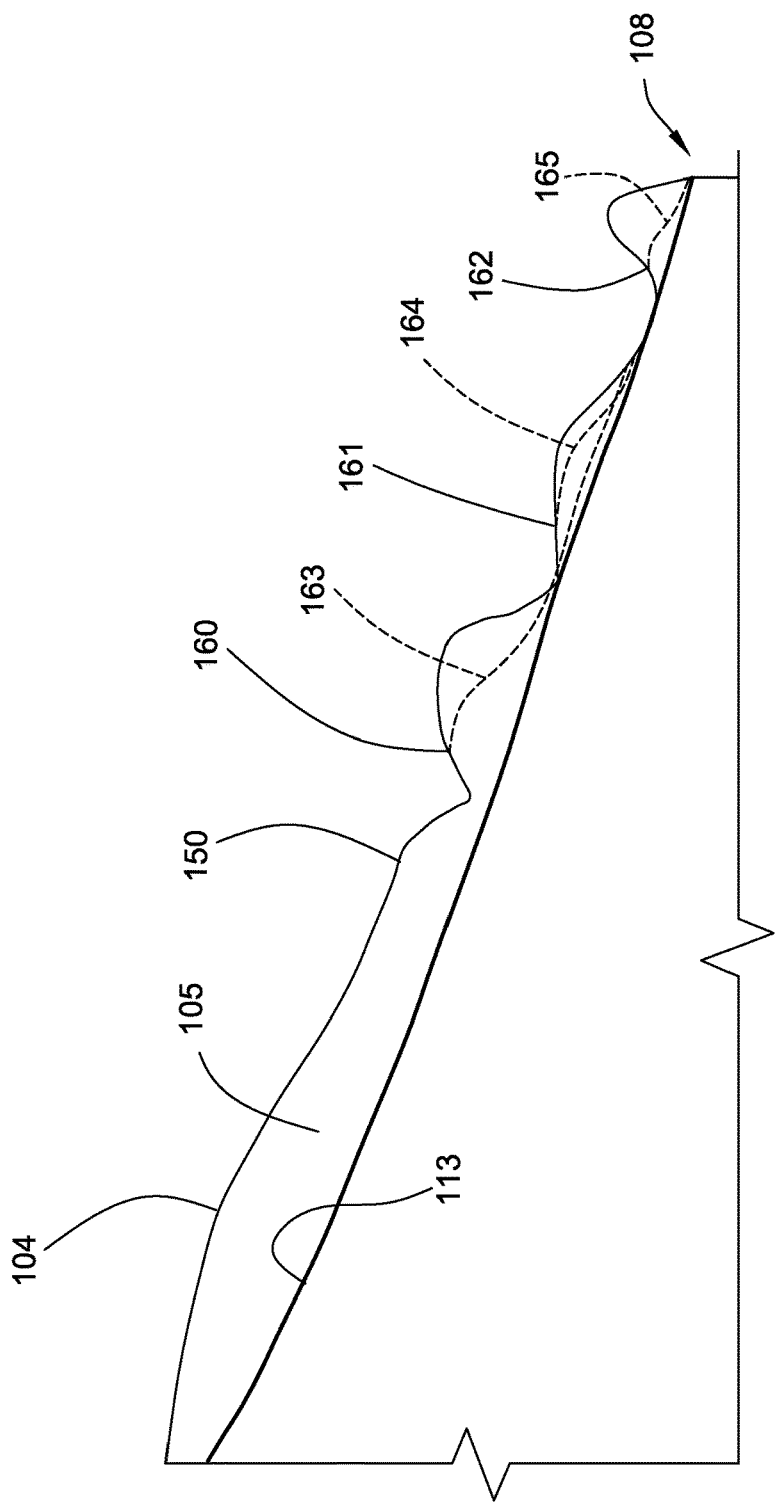
FIG. 6 depicts a cross-section similar to FIG. 5 but of another aspect of the cut optimization process in accordance with the disclosure.

FIGS. 5-6 depict an example of the planning system 45 determining the efficiency of an initial cut location and then comparing the efficiency of the initial cut location to the efficiencies of other potential cut locations. Referring first to FIG. 5, an initial cut location determined by other aspects of the planning system 45 is depicted at 150. The initial cut location 150 may be selected in any manner. The planning system 45 may be configured to simulate a material moving operation in which blade 15 enters the work surface 104 at cut location 150 and the tip 23 of blade 16 follows a generally Gaussian-shaped path 151 through the material 105 until reaching the carry surface 152 defined by the carry profile. The Gaussian-shaped path 151 and the carry profile define a target profile of blade 16. With such a target profile 153, all of the material above the proposed path of the tip 23 of the blade 16 (i.e., material between target profile 153 and work surface 104) would be moved towards the end location. The planning system 45 may also determine the time required to move the material to the end location. For such a proposed initial cut location 150, the efficiency would be:

$$\frac{V_I}{T_I} \qquad (2)$$

where $V_I$ designates the volume of material moved by the blade 16 beginning at the initial cut location 150 to the end location such as dump location 108 and $T_I$ designates the length of time necessary to move the material from the initial cut location to the end location.

After setting the initial cut location 150, the planning system 45 may analyze a plurality of potential cut locations between the initial cut location 150 and an end location of the path. The end location may be the dump location 108 such as crest 103 or any other location at which the material moving process ends. The planning system 45 may select the potential cut locations in any of a plurality of manners. For example, the planning system 45 may divide the path 117 between the initial cut location 150 and the end location into a plurality of equal length increments and perform an efficiency analysis on each increment. In another example, the path 117 may be divided in any other manner and the increments analyzed.

In still another example, the planning system 45 may determine potential cut locations based upon the target profile 153 associated with the initial cut location 150 and the position of the work surface 104. The planning system 45 may analyze the relationship between the work surface 104 and the target profile 153 for intersections between the work surface and the target profile and/or for locations in which the slope of the work surface is increasing relatively quickly relative to the target profile. The planning system 45 may be configured to limit the efficiency analysis to these locations as they may generally have a higher efficiency and/or may be more productive cutting locations relative to the contour of the work surface 104.

In FIG. 5, three locations along the target profile 153 of the initial cut location 150 intersect with the work surface 104 and are identified as 160-162. The planning system 45 may simulate cuts at each of the first potential cut location 160, the second potential cut location 161, and the third potential cut location 162 and determine their efficiency in the same manner as described above with respect to the initial cut location. FIG. 6 depicts the first potential cut location 160 with a target profile 163 depicted with a dashed line, the second potential cut location 161 with a target profile 164 depicted with a dashed line, and the third potential cut location 162 with a target profile 165 depicted with a dashed line.

The chart set forth below sets forth the efficiency of the initial cut location 150 and the three potential cut locations 160-162 based upon their percentage of blade load and the distance the material must be moved to the dump location 108. The efficiency is calculated by dividing the percentage of blade load by the distance to the dump location.

| Cut Location (Reference No.) | Blade load % | Distance to dump location (ft) | Efficiency |
| --- | --- | --- | --- |
| Initial (150) | 100 | 100 | 1.00 |
| Potential 1 (160) | 95 | 80 | 1.19 |
| Potential 2 (161) | 50 | 60 | 0.83 |
| Potential 3 (162) | 15 | 10 | 1.50 |

From the chart it may be seen that the efficiency of the first potential cut location 160 is higher than the efficiency of the initial cut location 150. While the third potential cut location 162 has the highest efficiency, the planning system 45 may be configured to disregard that potential location since the blade load percentage is lower than the minimum load threshold (e.g., 30%). Based upon the example depicted in FIGS. 5-6, the planning system 45 may discard the initial cut location 150 and provide instructions or commands for the machine 10 to begin a new cut at the optimized cut location located at the first potential cut location 160.

In some instances, it may be desirable for the planning system 45 to analyze additional potential cut locations while the machine is moving uphill from the dump location 108 after completing a cutting pass. In doing so, the planning system 45 may operate to select the optimized cut location while the machine 10 is moving along the path 117. It may be desirable for the controller 36 to move the machine 10 uphill only until it reaches the optimized cut location and then send appropriate commands to begin a new cutting pass or operation. Moving the machine 10 farther uphill than the optimized cut location may be inefficient as it will result in wasted fuel and time as the machine is subsequently moved downhill to the optimized cut location in an unloaded manner. Further, maintaining the machine 10 at the dump location 108 during the analysis process may also be inefficient as it may increase the cycle time for the cutting passes and increase fuel usage while idling. By controlling the speed of the machine 10 during the analysis process, fuel usage and time may also be optimized.

Figure 7:
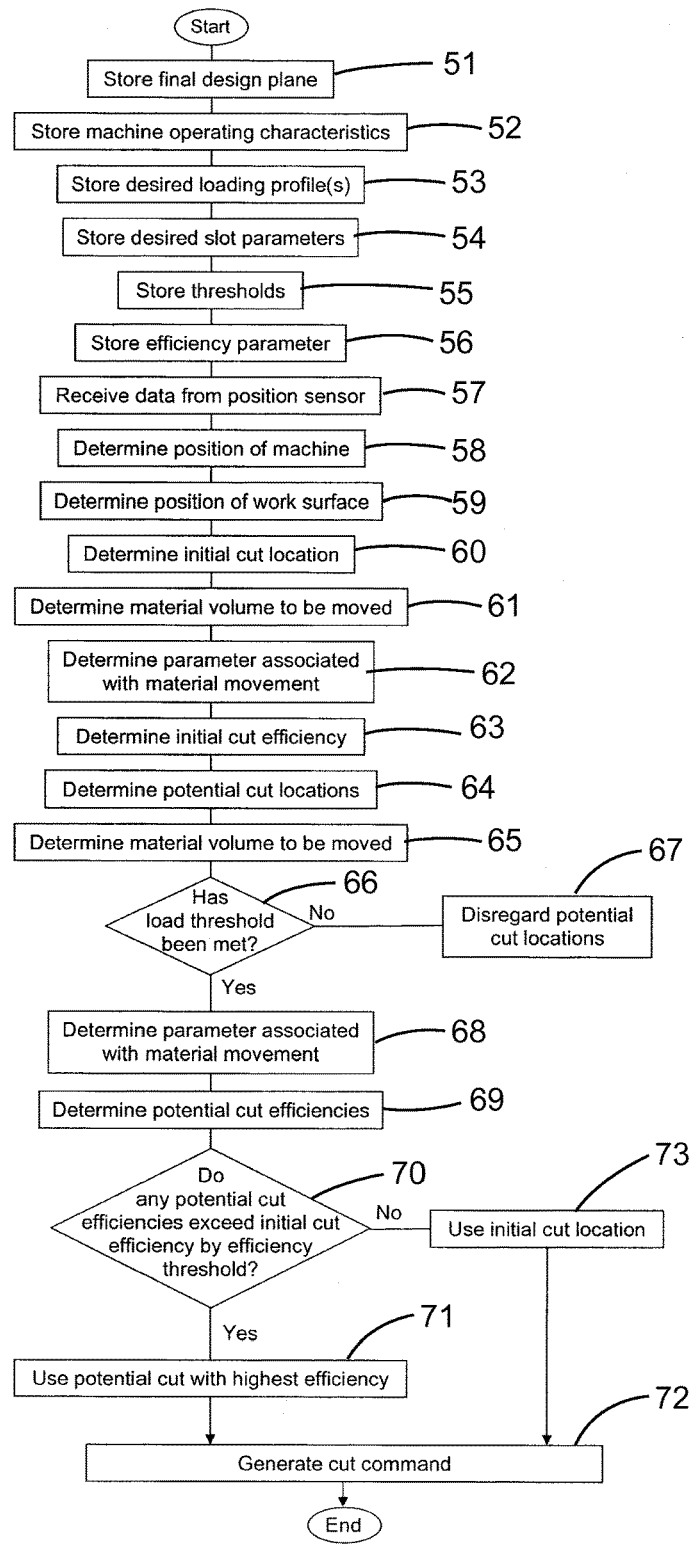
FIG. 7 depicts a flowchart illustrating the cut optimization process in accordance with the disclosure.

The flowchart in FIG. 7 depicts a process in which the planning system 45 may determine an optimal location for a cut 114. At stage 51, the final design plane 112 may be set or stored within or entered into the controller 36. In one embodiment, the final design plane 112 may be entered by an operator or other personnel. In another embodiment, the final design plane 112 may be generated by the controller 36.

At stage 52, the operating characteristics of the machine 10 may be entered into controller 36. The operating characteristics may include a desired maximum load on the machine 10 and the dimensions of the machine including those of blade 16. The dimensions of blade 16 may be used by controller 36 to determine the volume of material that may be moved by the machine 10.

The desired loading profile 121 of the target profile 120 may be entered into the controller 36 at stage 53. As stated above, the loading profile 121 may have any desired configuration. At stage 54, the carry profile 122 or slot parameters may be entered into the controller 36. The slot parameters may define the shape of the carry surface 116, the depth of carry surface below the work surface 104 and each subsequent carry surface, the angle 125 of the carry surface 116 relative to a fixed reference, and the curvature of the carry surface.

At stage 55, a load threshold and an efficiency threshold may be set or stored within the controller 36. The load threshold may set the minimum required load to be carried by the blade 16 for a potential cut location. The efficiency threshold may set the minimum required efficiency for the planning system 45 to change from the initial cut location 150. More specifically, the planning system 45 may be configured so that the cut location will not be changed from the initial cut location 150 to a new cut location unless the efficiency of the new cut location exceeds the efficiency threshold.

The parameter against which the volume of material moved will be compared may be set or stored at stage 56 by management personnel, an operator, other personnel, or may be preset within the planning system 45. The parameter may be the time required to move to the dump location 108, the distance to the dump location, the amount of fuel used to move the material to the dump location, and/or any combination of these parameters or any other desired parameter.

The controller 36 may receive at stage 57 data from the position sensor 28. At stage 58, the controller 36 may determine the position of the machine 10 based upon the data from the position sensor 28.

The position or configuration of the work surface 104 may be determined at stage 59. The configuration of the work surface 104 may be determined in any desired manner including moving machines autonomously about the work site 100. In an alternate process, an operator may manually operate machines 10, either from within the cab 24 of the machine or by remote control, and the topography of the work site 100 recorded. In another alternate embodiment, an electronic map of the work site may be generated by moving a mapping vehicle (not shown) about the work site. As the machine 10 moves along the path 117, the position of the machine may be used to determine the position of the work surface and update the electronic map of the work site 100 within controller 36.

The initial cut location 150 may be set or determined at stage 60 in any manner as described in more detail above. The planning system 45 may determine at stage 61 the volume of material to be moved based upon the desired loading profile 121 including the shape of the cut as well as its length, the desired carry profile 122, the position of the work surface 104, and the position of the initial cut location 150. The analysis may also be based upon the characteristics of the material to be moved and any other relevant information.

The planning system 45 may determine at stage 62 the parameter associated with moving the material from the initial cut location to the end location. In some instances, the distance to the end location from the cut location 115 may be used. In other instances, it may be desirable to use the time expected for the machine 10 to reach the end location. At stage 63, the planning system 45 may determine the initial cut efficiency or the efficiency of the material moving process from the initial cut location 150 to the end location. The initial cut efficiency is equal to the amount of material moved (which may be expressed in terms of a percentage of blade load, overall volume, or any other desired measure) divided by the measured or calculated parameter (e.g., distance, time, etc.) required to move the material from the initial cut location 150 to the end location. In an example in which the amount of material is a percentage of blade load and the parameter is time, the initial efficiency may be determined by dividing the percentage of blade load by the time required to move the material from the initial cut location 150 to the desired end location.

The planning system 45 may determine at stage 64 a plurality of potential cut locations in any desired manner. As depicted in FIGS. 5-6, the potential cut locations may correspond to intersections between the work surface 104 and the target profile 153 or locations in which the slope of the work surface is increasing relatively quickly relative to the target profile.

The planning system 45 may determine at stage 65 the volume of material to be moved from each potential cut location to the end location such as end location as described above with respect to stage 61. In doing so, the planning system 45 may determine volume based upon a desired loading profile at each potential cut location including its shape, length, the desired slot parameters, and the position of the work surface 104. Characteristics of the material to be moved and any other relevant information may also be used for the analysis.

At decision stage 66, the planning system may determine whether the load threshold is met for each potential cut location. In other words, the planning system 45 may determine whether the amount of material exceeds the load threshold. Any potential cut locations that do not meet the load threshold may be disregarded at stage 67.

For those potential cut locations that do exceed the load threshold, the planning system 45 may determine at stage 68 the parameter associated with moving the material from the potential cut locations to the end location. The parameter should be of the same type as that used with the initial cut analysis. In other words, if the initial cut analysis was determined based upon the measured load on the blade 16 as a function of distance from the initial cut location 150 to the end location, the potential cut efficiencies should also be determined based upon the measured load on the blade 16 as a function of distance from the respective potential cut locations to the end location.

At stage 69, the planning system 45 may determine the potential cut efficiency for each remaining potential cut. In doing so, the planning system may determine the amount of material moved (expressed in the same units as in the initial cut analysis) divided by the measured or calculated parameters (expressed in the same units as in the initial cut analysis) required to move the material from the respective potential cut locations to the end location.

At decision stage 70, the planning system 45 may determine whether the efficiency of any of the potential cut locations exceeds the initial cut efficiency determined at stage 63. As discussed above, in some instances, the planning system 45 may require that a potential cut efficiency exceed the initial cut efficiency by a predetermined threshold (e.g., 5-10%). If the efficiency of any of the potential cut locations exceeds the initial cut efficiency by the desired threshold, the planning system 45 may set or store at stage 71 the potential cut location having the highest efficiency as the optimized cut location and generate appropriate commands at stage 72 to direct the machine to cut the work surface at such optimized cut location.

If the none of the potential cut locations have an efficiency that exceeds the initial cut efficiency by the desired threshold, the planning system 45 may continue to use the initial cut location 150 as the optimized cut location at stage 73 and generate appropriate commands at stage 72 to direct the machine to cut the work surface at the initial cut location.

INDUSTRIAL APPLICABILITY

The industrial applicability of the control system 35 described herein will be readily appreciated from the foregoing discussion. The foregoing discussion is applicable to systems in which a plurality of machines 10 are operated autonomously, semi-autonomously, or manually at a work site 100. Such system may be used at a mining site, a landfill, a quarry, a construction site, a roadwork site, a forest, a farm, or any other area in which movement of material is desired.

Machine 10 may be operative with a planning system 45 of control system 35 and operate to determine an initial location for a cut 114. The initial cut location 150 may be determined in any of a variety of manners. The planning system 45 may further be operative to analyze a plurality of additional potential cut locations to compare their efficiency to the efficiency of the initial cut location 150. The efficiency may be calculated by determining the ratio of the amount of material moved to a parameter associated with the material movement process. In one example, the parameter may be the distance the material is moved from the cut location to the end location. In another example, the parameter may be the time necessary to move the material from the cut location to the end location. Additional parameters may also be used. The planning system 45 may select the cut location having the highest efficiency.

In some instances, it may be desirable for the planning system 45 to determine the initial cut location 150 and analyze the potential cut locations while the machine 10 is moving uphill after completing a cutting pass. By synchronizing the determination of the optimized cut location with the movement of the machine 10 uphill towards the high wall 102, it may be possible to improve the efficiency of the operation of the machine. For example, fuel and time will not be wasted while idling during the analysis process and the machine will not move farther uphill than is necessary.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for determining an optimized cut location for a work implement of a machine, the machine moving on a work surface along a path, comprising:
 a position sensor for generating position signals indicative of a position of the work surface;
 a ground engaging drive mechanism for moving the machine along the path;
 a controller configured to:
  store an end location of the path;
  determine the position of the work surface based upon the position signals;
  store a position of a carry surface, the carry surface extending between a first location and the end location of the path, the carry surface is below the work surface;
  store a first cut location, a first loading profile, and a first carry profile, the first carry profile extending along the carry surface, wherein a combination of the first loading profile and the first carry profile has a first length extending between the first cut location and the end location of the path;

determine a first efficiency for moving a first amount of material upon moving the work implement from the first cut location to the end location of the path along the first loading profile and the first carry profile, the first efficiency is based upon the first amount of material to be moved along the first loading profile and first carry profile, a first parameter associated with moving the first amount of material, and the first loading profile;

determine a plurality of potential cut locations along the path, each of the potential cut locations is disposed between the first cut location and the end location of the path;

determine a loading profile and a carry profile for each of the potential cut locations, each carry profile extending along the carry surface, wherein a combination of each loading profile and its respective carry profile has a length extending between its potential cut location and the end location of the path, the length of each loading profile in combination with its respective carry profile is different from and less than the first length;

determine an efficiency for moving an amount of material upon moving the work implement from each of the potential cut locations to the end location of the path along a respective loading profile and carry profile associated with each potential cut location, the efficiency for each of the plurality of potential cut locations is based upon the amount of material to be moved along the loading profile and carry profile associated with each potential cut location, a parameter associated with moving the amount of material between each potential cut location and the end location, and the loading profile associated with each potential cut location;

compare the efficiency of each potential cut location to the first efficiency and select the optimized cut location from one of the first cut location and the plurality of potential cut locations based upon the first efficiency and the efficiency of each of the plurality of potential cut locations, wherein the optimized cut location has the highest efficiency;

generate drive commands to control the ground engaging drive mechanism to move the machine along the path to the optimized cut location;

generate cut commands to autonomously cut the work surface at the optimized cut location; and wherein based on the generated drive commands, the ground engaging drive mechanism moves the machine along the path to the optimized cut location and based on the generated cut command, the work surface is autonomously cut with the work implement at the optimized cut location.

2. The system of claim 1, where the controller is configured to determine the first efficiency by dividing the initial amount of material to be moved by the first parameter and determine the efficiency of each potential cut location by dividing the amount of material to be moved for each potential cut location by the parameter associated with moving the amount of material for each respective potential cut location.

3. The system of claim 1, wherein the first parameter is a first length of time required to move the first amount of material from the first cut location to the end location and the parameter associated with each potential cut location is a length of time required to move the amount of material associated with the each respective potential cut location from the potential cut location to the end location.

4. The system of claim 3, wherein the controller is further configured determine the first length of time and the length of time associated with each respective potential cut location based upon the position of the work surface.

5. The system of claim 4, wherein the controller is further configured to divide the path into a plurality of horizontally spaced apart increments, determine a travel time along each of the plurality of increments based upon an increment parameter, and determine the first length of time and the length of time associated with each respective potential cut location based upon a total of the travel times along the plurality of increments.

6. The system of claim 5, wherein the increment parameter is a slope of the work surface along each increment.

7. The system of claim 3, wherein the controller is further configured to store a target speed of the machine and determine the first length of time and the length of time associated with each respective potential cut location based upon the target speed.

8. The system of claim 1, wherein the first parameter is a distance of the first cut location to the end location and the parameter associated with each respective potential cut location is a distance of each potential cut location to the end location.

9. The system of claim 1, wherein the first parameter is an amount of fuel used to move the amount of material from the first cut location to the end location and the parameter associated with each respective potential cut location is an amount of fuel used to move the amount of material from each potential cut location to the end location.

10. The system of claim 1, wherein the controller is configured to select the optimized cut location while the machine is moving along the path.

11. The system of claim 1, wherein the controller is further configured to determine potential cut locations based upon the first loading profile, the first carry profile and the position of the work surface.

12. The system of claim 11, wherein the controller is further configured to determine potential cut locations based upon intersections between the work surface and the first loading profile and the first carry profile.

13. The system of claim 11, wherein the controller is further configured to determine potential cut locations based upon locations in which a slope of the work surface is increasing relative to the first loading and the first carry profile.

14. The system of claim 1, wherein the controller is further configured to determine potential cut locations by dividing the path into a plurality of horizontally spaced apart increments.

15. A controller-implemented method for determining an optimized cut location for a work implement of a machine, the machine moving on a work surface along a path, comprising:

storing an end location of the path;

determining the position of the work surface based upon position signals from a position sensor;

storing a position of a carry surface, the carry surface extending between a first location and the end location of the path, the carry surface is below the work surface;

storing a first cut location, a first loading profile, and a first carry profile, the first carry profile extending along the carry surface, wherein a combination of the first loading profile and the first carry profile has a first length extending between the first cut location and the end location of the path;

determining a first efficiency for moving a first amount of material upon moving the work implement from the first cut location to the end location of the path along the first loading profile and the first carry profile, the first efficiency is based upon the first amount of material to be moved along the first loading profile and first carry profile, a first parameter associated with moving the first amount of material, and the first loading profile;

determining a plurality of potential cut locations along the path, each of the potential cut locations is disposed between the first cut location and the end location of the path;

determining a loading profile and a carry profile for each of the potential cut locations, each carry profile extending along the carry surface, wherein a combination of each loading profile and its respective carry profile has a length extending between its potential cut location and the end location of the path, the length of each profile in combination with its respective carry profile is different from and less than the first length;

determining an efficiency for moving an amount of material upon moving the work implement from each of the potential cut locations to the end location of the path along a respective loading profile and carry profile associated with each potential cut location, the efficiency for each of the plurality of potential cut locations is based upon the amount of material to be moved along the loading profile and carry profile associated with each potential cut location, a parameter associated with moving the amount of material between each potential cut location and the end location, and the loading profile associated with each potential cut location;

comparing the efficiency of each potential cut location to the first efficiency and selecting the optimized cut location from one of the first cut location and the plurality of potential cut locations based upon the first efficiency and the efficiency of each of the plurality of potential cut locations, wherein the optimized cut location has the highest efficiency;

generating drive commands to control a ground engaging drive mechanism to move the machine along the path to the optimized cut location;

generating cut commands to autonomously cut the work surface at the optimized cut location; and wherein based on the generated drive commands, the ground engaging drive mechanism moves the machine along the path to the optimized cut location and based on the generated cut command, the work surface is autonomously cut with the work implement at the optimized cut location.

16. The method of claim 15, further including determining the first efficiency by dividing the first amount of material to be moved by the first parameter and determining the efficiency of each potential cut location by dividing the amount of material to be moved for each potential cut location by the parameter associated with moving the amount of material for each respective potential cut location.

17. The method of claim 15, further including selecting the optimized cut location while the machine is moving along the path.

18. The method of claim 15, further including determining potential cut locations based upon a target profile of the initial cut location and the position of the work surface.

19. A machine, comprising:
a prime mover;
a work implement for engaging a work surface along a path;
a position sensor for generating position signals indicative of a position of the work surface;
a ground engaging drive mechanism for moving the machine along the path;
a controller configured to:
store an end location of the path;
determine the position of the work surface based upon the position signals;
store a position of a carry surface, the carry surface extending between a first location and the end location of the path, the carry surface is below the work surface;
store a first cut location, a first loading profile, and a first carry profile, the first carry profile extending along the carry surface, wherein a combination of the first loading profile and the first carry profile has a first length extending between the first cut location and the end location of the path;
determine a first efficiency for moving a first amount of material upon moving the work implement from the first cut location to the end location of the path along the first loading profile and the first carry profile, the first efficiency is based upon the first amount of material to be moved along the first loading profile and first carry profile, a first parameter associated with moving the first amount of material, and the first loading profile;
determine a plurality of potential cut locations along the path, each of the potential cut locations is disposed between the first cut location and the end location of the path;
determine a loading profile and a carry profile for each of the potential cut locations, each carry profile extending along the carry surface, wherein a combination of each loading profile and its respective carry profile has a length extending between its potential cut location and the end location of the path, the length of each loading profile in combination with its respective carry profile is different from and less than the first length;
determine an efficiency for moving an amount of material upon moving the work implement from each of the potential cut locations to the end location of the path along a respective loading profile and carry profile associated with each potential cut location, the efficiency for each of the plurality of potential cut locations is based upon the amount of material to be moved along the loading profile and carry profile associated with each potential cut location, a parameter associated with moving the amount of material between each potential cut location and the end location, and the loading profile associated with each potential cut location;
compare the efficiency of each potential cut location to the first efficiency and select the optimized cut location from one of the first cut location and the plurality of potential cut locations based upon the first efficiency and the efficiency of each of the plurality of potential cut locations, wherein the optimized cut location has the highest efficiency;

generate drive commands to control the ground engaging drive mechanism to move the machine along the path to the optimized cut location;
generate cut commands to autonomously cut the work surface at the optimized cut location; and
wherein based on the generated drive commands, the ground engaging drive mechanism moves the machine along the path to the optimized cut location and based on the generated cut command, the work surface is autonomously cut with the work implement at the optimized cut location.

* * * * *